(No Model.) 2 Sheets—Sheet 1.
G. ERTEL.
HAY PRESS.
No. 261,323. Patented July 18, 1882.
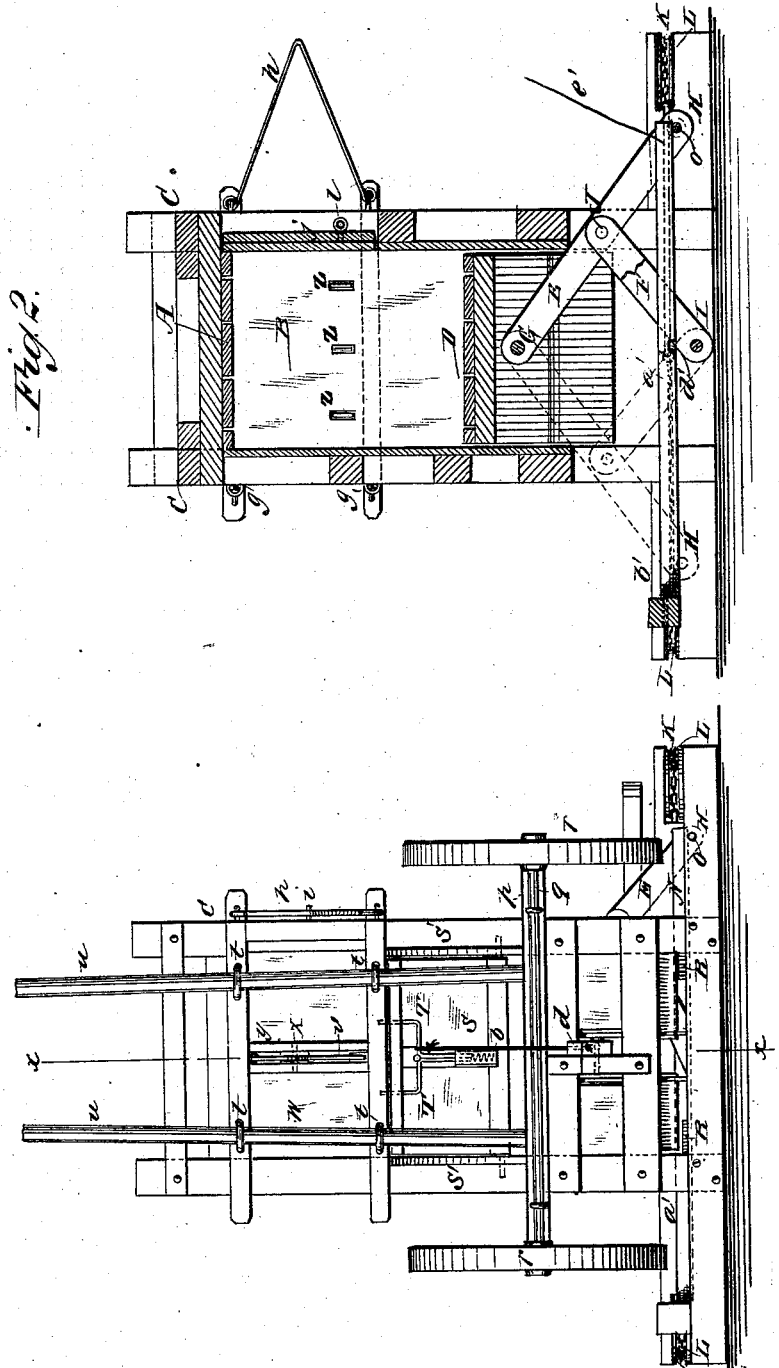
WITNESSES:
Francis McArdle
C. Sedgwick
INVENTOR:
G. Ertel
BY Munn & Co
ATTORNEYS.

(No Model.) 2 Sheets—Sheet 2.
G. ERTEL.
HAY PRESS.
No. 261,323. Patented July 18, 1882.
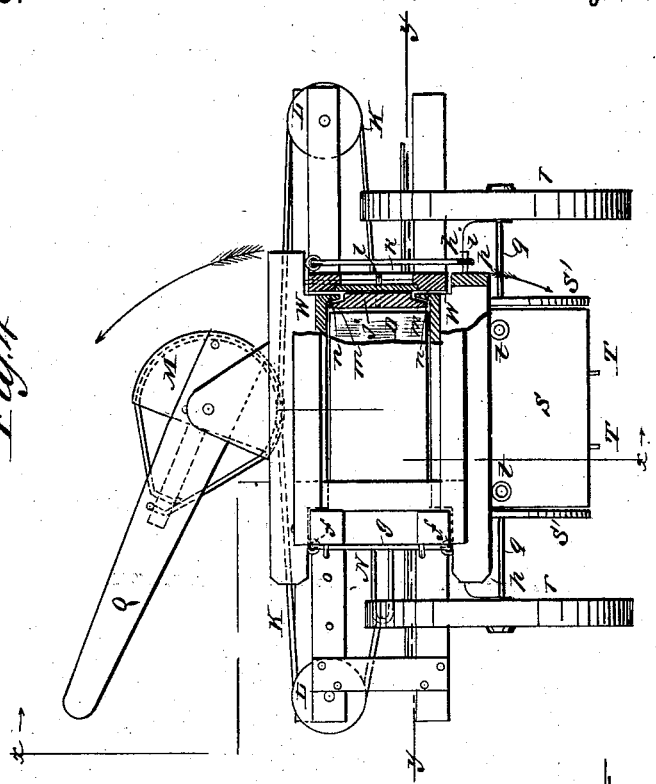
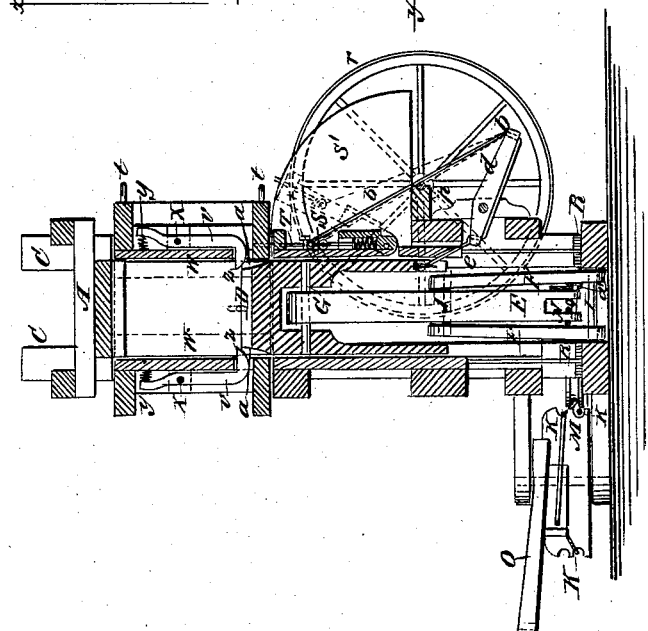
WITNESSES:
Francis McArdle
C. Sedgwick
INVENTOR:
G. Ertel
BY Munn & Co
ATTORNEYS.

UNITED STATES PATENT OFFICE.

GEORGE ERTEL, OF QUINCY, ILLINOIS.

HAY-PRESS.

SPECIFICATION forming part of Letters Patent No. 261,323, dated July 18, 1882.

Application filed April 14, 1882. (No model.)

*To all whom it may concern:*

Be it known that I, GEORGE ERTEL, of Quincy, in the county of Adams and State of Illinois, have invented a new and Improved Hay-Press, of which the following is a full, clear, and exact description.

This invention consists of improvements in presses, whereby the hay or other material is pressed by successive increments in a manner calculated to insure the desired compactness, and by an arrangement of apparatus for applying the power by which the work may be accomplished rapidly and cheaply, the machinery being simple, cheap, and durable, and the press being contrived for portability, all as hereinafter more fully described.

Reference is to be had to the accompanying drawings, forming part of this specification, in which similar letters of reference indicate corresponding parts in all the figures.

Figure 1 is a front elevation of the improved press. Fig. 2 is a sectional elevation on line $y\,y$ of Fig. 4. Fig. 3 is a sectional elevation on line $x\,x$ of Fig. 1. Fig. 4 is partly a bottom view and partly a horizontal section, and Fig. 5 is a plan of a link employed in the chain for applying the power to work the follower.

A represents the head of the press, against which the hay is pressed in the upper part of the chamber B, said head being located on the upper part of the vertical frame C.

D represents the follower working up and down in said chamber, and being operated by the lever E and toggle-jointed links F, the lever E being jointed to the follower at G and having the power applied to it at H, and the links F being jointed to the bed-frame at I and to lever E at J, the arrangement being such that lever E can swing alike each way from the vertical line of its axis G, passing between the links F and over the pivot I of said links, as indicated by the dotted lines, Fig. 2. The power is applied to lever E by a chain, K, extending each way from it around guide-pulleys L to the drum M, the said lever being connected to the chain by the long link N, through which the free end of the said lever E projects, and in which it is secured by a pin, O. The chain is hooked onto each end of the link at P, and passes therefrom in opposite directions to the drum, whereon it winds in opposite directions, so that the drum M, being moved forward and backward by a horse hitched to the end of the sweep Q and working to and fro, will work the link N and the lever E forward and backward from side to side of the machine.

The follower is raised up to press an increment of hay by every traverse of the link in both directions. The link draws the lever E to the vertical line and a little past, when the follower falls, throwing the lever over to the other end of the link, so that the follower beats up a batch of hay every time the horse pulls the sweep either way, thus losing no time nor labor by going back to the starting-point idly or without effect, or to draw the follower back, as in the case of single-acting power apparatus. The link N keeps the chain K taut all the same, whether the follower is being raised or not. The follower falls upon the rubber or other cushions, R, which relieve the shocks. The lever E and links F fall very nearly flat, so that very little space is required for them and the follower when down, and also so that in the beginning of the movement of the follower, when the resistance is light, the motion is quick. By the toggle-jointed link device the power increases on the follower as the resistance becomes greater, whereby such contrivance is well adapted to the purpose. Each time the follower falls a quantity of hay is supplied to the lower part of the chamber B over the table S by the attendant. The table is then quickly swung up to close the case, as shown in Figs. 1 and 3, where it is secured by the spring-stops T. Then the follower goes up and presses the hay into the upper part of said chamber, where the hay is retained by the hooks V, pivoted upon the outside of the upper doors, W, at X, and having springs Y to cause the points Z to project into the case to catch and hold the hay, and allowing them to yield when the hay is passed up. The follower is notched in the upper corners at *a* to pass up along the hooks. The spring-stops T, by which the door S is fastened shut, are connected by cord *b*, lever *d*, and cord *e* with the follower, so that when it arrives at the uppermost part of its ascent said follower trips the stops T to let the door fall, ready for the attendant to feed in the hay as soon as the follower drops. Door S drops between two stationary guards, S', between which the hay is fed into the case.

The upper doors, W, inclosing the sides of the part of the chamber B in which the bale is formed, have their hinges $f$ on rods $g$ connecting the hinges of the two doors for security against the bursting pressure of the bale, and at the opening sides the said doors are connected by the long hasp $h$ and pin $i$ for the same purpose. The side $j$ of the bale-chamber, against which these two doors close, is movable, to a limited extent, toward and from the interior, and supported on a rod, $k$, by an eye-stud, $l$, and the edges of said side are beveled at $m$ in order that the side $j$ may be forced in a little by the beveled lips $n$ of the doors W when they are closed, and so held while the bale is pressed to become slack when the doors W are opened, so that the bale will discharge more freely after being tied.

To make the press portable, and at the same time capable of being set up for use readily, and as readily set on wheels, a beam, $p$, is attached to the side, just below the feeding-door S, to which a metal rod, $q$, is attached, on which rod wheels $r$ are mounted, and the frame of the door W of that side of the press is provided with eye-studs $t$, in which poles $u$ are inserted to serve for shafts by which to roll the press about on the wheels, whereon the press is readily mounted by tilting said press over on the wheels.

$a'$ represents a bar pivoted at $b'$, and having a notch, $d'$, to be used for locking the follower to hold the bale up while being tied by dropping the notch on the pin O of lever E when said lever stands in the middle position, the said bar being extended to the other side of the press, where it is provided with a cord, $c'$, for lifting it off the pin when the follower is to be let down after the bale is discharged.

I propose to apply two other and smaller wheels to rest the front end of the press on when handling it about.

Having thus described my invention, what I claim as new, and desire to secure by Letters Patent, is—

1. The combination, with the lever E, jointed to the follower at G, of the toggle-jointed links F, jointed to the frame at I and to the lever at J, whereby the lever may be swung on either side of its fulcrum, pass between the links, and extend over the link-pivots, as shown and described.

2. The combination of the drum M and sweep Q with chain K, link N, lever E, links F, and follower D, substantially as specified.

3. The combination of notched bar $a'$ with lever E, links F, and follower D, substantially as specified.

4. The spring-stops T of door S, connected to follower D by cords $b$ $c$, and lever $d$, for being tripped by said follower, substantially as specified.

5. The hinge-joints $f$ of the two doors W, connected by rods $g$, in combination with hasp $h$ and stud $i$, connecting the opening sides of the said doors, substantially as specified.

6. The wheels $r$, axle $q$, and beam $p$, combined with the baling-press, substantially as specified.

7. The combination, with a baling-press having wheels $r$, of the eye-studs $t$ and poles $u$, substantially as specified.

8. The slack side $j$ of the press-case, connected to the press by eye-stud $l$ and rod $k$, substantially as specified.

9. The combination, with the doors W, having inwardly-projecting lips $n$, of the slack side $j$, having inwardly-beveled edges $m$, substantially as and for the purpose set forth.

GEORGE ERTEL.

Witnesses:
EDWARD LEVI,
RICHARD JANSEN.